(12) United States Patent
He

(10) Patent No.: US 7,342,515 B2
(45) Date of Patent: Mar. 11, 2008

(54) HYBRID CENTERED HEAD-DOWN AIRCRAFT ATTITUDE DISPLAY AND METHOD FOR CALCULATING DISPLAYED DRIFT ANGLE LIMIT

(75) Inventor: Gang He, Morristown, NJ (US)

(73) Assignee: Honeywell International, Inc., Morristown, NJ (US)

( * ) Notice: Subject to any disclaimer, the term of this patent is extended or adjusted under 35 U.S.C. 154(b) by 247 days.

(21) Appl. No.: 11/249,237

(22) Filed: Oct. 12, 2005

(65) Prior Publication Data

US 2007/0080828 A1 Apr. 12, 2007

(51) Int. Cl.
*G01C 21/00* (2006.01)

(52) U.S. Cl. .................... 340/974; 73/178 T; 701/4

(58) Field of Classification Search .................. 340/974
See application file for complete search history.

(56) References Cited

U.S. PATENT DOCUMENTS

| | | | |
|---|---|---|---|
| 4,786,905 A * | 11/1988 | Muller | 340/975 |
| 5,745,054 A | 4/1998 | Wilkens | |
| 6,853,315 B2 * | 2/2005 | Schiller et al. | 340/974 |
| 2003/0132860 A1 | 7/2003 | Feyereisen et al. | |
| 2004/0160341 A1 | 8/2004 | Feyereisen et al. | |
| 2006/0164262 A1 * | 7/2006 | Wyatt et al. | 340/973 |

FOREIGN PATENT DOCUMENTS

GB  1209922 A  10/1970

OTHER PUBLICATIONS

EP Search Report, 06121880.6, Feb. 20, 2007.

* cited by examiner

*Primary Examiner*—George Bugg
(74) *Attorney, Agent, or Firm*—Ingrassia, Fisher & Lorenz, P.C.

(57) ABSTRACT

Methods and apparatus are provided for displaying terrain and attitude data symbology for an aircraft. The apparatus is a hybrid centered head-down display for an aircraft having a monitor configured to generate a display and a processor coupled to the display. The display has a centerline. The processor is configured to calculate a displayed drift angle limit, a displayed drift angle, align the centerline of the display with reference to the displayed drift angle, and generate on the display a first symbol corresponding to a terrain and a second symbol corresponding to an attitude of the aircraft. The processor is further configured to center the first symbol and the second symbol with reference to the centerline.

20 Claims, 3 Drawing Sheets

HYBRID CENTERED HEAD-DOWN AIRCRAFT ATTITUDE DISPLAY AND METHOD FOR CALCULATING DISPLAYED DRIFT ANGLE LIMIT

FIELD OF THE INVENTION

The present invention generally relates to avionics displays, and more particularly relates to a display of aircraft attitude on a hybrid centered head-down display.

BACKGROUND OF THE INVENTION

Head-up Displays (HUDs) are typically used in aircraft to provide flight attitude information as referenced with respect to a heading of the aircraft. The term "heading," or heading angle, is referred to herein as an angle associated with a longitudinal axis of the aircraft with respect to north. Primary control symbols presented on HUDs include a Flight Path Vector (FPV) and other earth referenced data such as airports, runways, and the like.

In comparison with HUDs, head-down displays generally have a visually smaller display screen, e.g., smaller in angle subtended at a pilot's eye. Head-down displays also display a wide variety of data that are generally not provided on HUDs. On head-down displays, symbology is generally not displayed overlaying actual outside objects (e.g., mountains, buildings, etc.), such as found with HUDs. Instead, synthetic analogs or enhanced sensor images of actual outside objects may be displayed in head-down displays. For example, flight attitude information may be projected over terrain symbology as if looking out of a cockpit window.

Wind and other forces typically influence an aircraft so that the aircraft heading may not coincide with an actual direction of travel, or track. The term "track," or track angle, is referred to herein as an angle of a ground speed vector with respect to north. For example, track is the direction from north that the aircraft is moving. Most flying conditions encountered by pilots generate a track that is different from a heading of the aircraft. While using a head-down display that is oriented with reference to the heading of the aircraft, such as mimicking HUD, the pilot typically makes numerous flight adjustments to account for the track of the aircraft.

A head-down display is typically displayed in a heading-up/track-up, or hybrid centered mode. When displaying in hybrid centered mode, various approaches are needed to ensure smooth transitions as well as to provide sufficient awareness of heading and drift conditions. In particular, a displayed drift angle is displayed in a hybrid centered head-down display to aid the aircraft crew with flight attitude information. The term "displayed drift angle", is referred to herein as the angle of separation between the track and a displayed centerline. The displayed drift angle is different from a conventional drift angle that is defined as the difference between the track and heading angles in both heading or track centered displays.

Accordingly, it is desirable to provide a hybrid centered head-down display including displayed drift angle limits, wherein displayed is earth referenced symbology, such as synthetic terrain, that is useful to a flight crew for flight management during different flight conditions. In addition, it is desirable to provide a method of calculating optimal displayed drift angles and displayed drift angle limits when displaying earth referenced symbology that will fit on a head-down display and that is useful for flight management during different flight conditions and reduces pilot workload. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Apparatus and methods are provided for displaying terrain data symbology in an aircraft. The apparatus is a hybrid centered head-down display for an aircraft having a track, a heading, and an attitude. The hybrid centered head-down display has a monitor configured to generate a display of a view in front of the aircraft and a processor coupled to the display. The display has a centerline. The processor is configured to determine a displayed drift angle limit in response to current flying conditions and a displayed drift angle. The processor is further configured to align the centerline of the display, wherein the displayed drift angle is equal to or less than the displayed drift angle limit. The processor generates on the display a first symbol representing a terrain, a second symbol representing the attitude, and an optional third symbol corresponding to a flight path of the aircraft. The processor is further configured to position the first symbol such that terrain objects to which the aircraft is tracking towards are centered with reference to the track of the aircraft, the second symbol aligned with the center of the display, and the optional third symbol with reference to the track of the aircraft.

In addition, provided is a method for displaying information on a hybrid centered head-down display for an aircraft, the aircraft having a track, a heading, and an attitude. The method including the steps of: determining a displayed drift angle limit and a displayed drift angle, positioning a centerline substantially between the track and the heading, with the displayed drift angle equal to or less than the displayed drift angle limit; aligning a centerline of the display with the displayed drift angle; generating a first symbol on the display, the first symbol corresponding to a terrain; generating a second symbol on the display, the second symbol corresponding to the attitude; and, centering the first symbol and the second symbol with reference to the displayed drift angle.

Finally, provided is an avionics display program product for a hybrid centered head-down display of an aircraft, the aircraft having a track, a heading, and an attitude, the avionics display program executable to: determine a displayed drift angle limit, determine a displayed drift angle, the displayed drift angle having a value between the track and the heading and equal to or less than the displayed drift angle limit; center a display with reference to the displayed drift angle; and, generate on the hybrid centered head-down display a first symbol representing a terrain and a second symbol representing the attitude. The program is further executable to center the first symbol and the second symbol with reference to the displayed drift angle.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
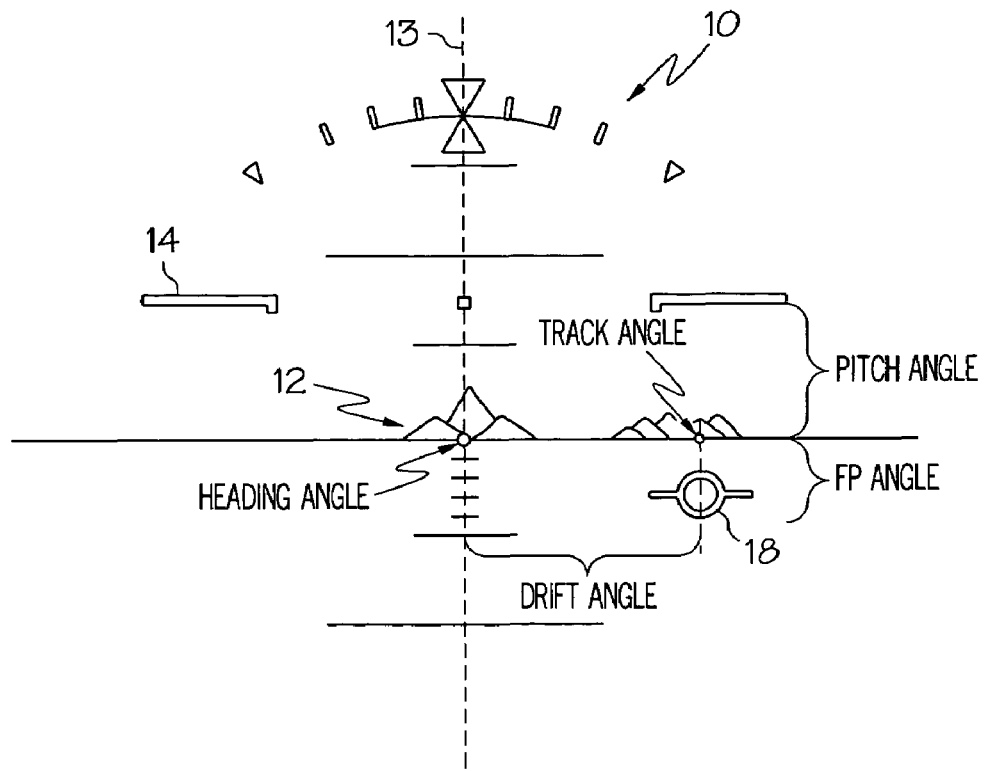
FIG. 1 is a diagram illustrating a conventional head-down display.

Referring to the drawings, FIG. 1 is a diagram illustrating a prior art head-down display 10 with terrain and flight path representations. The display 10 is referenced with respect to a heading angle of an aircraft, and terrain symbology 12 is presented that represents a variety of terrain as viewed along the heading of the aircraft (e.g., out of the aircraft cockpit in front of the nose of the aircraft). This conventional head-down display 10 simulates a view as seen using a HUD, e.g., the head-down display 10 provides a view that is aligned with the heading of the aircraft.

The heading angle is positioned and aligned with a centerline 13 of the display 10, and a symbol 14 representing an attitude of the aircraft is shown with reference to the heading angle. The attitude symbol 14 indicates a pitch angle and a roll angle. The term "pitch angle," or pitch, is referred to herein to indicate an angle of the longitudinal axis of the aircraft with respect to the local level. The term "roll angle," or roll, is referred to herein to indicate an angle of the lateral axis of the aircraft with respect to the local level. For example, the attitude symbol 14 may depict the aircraft wings as one or more horizontal marks. With respect to a horizon line rendered on the display 10, the attitude symbol 14 displace up and down in response to changes in the pitch of the aircraft. Similarly, the attitude symbol 14 rotates with respect to the horizon line in response to changes in the roll of the aircraft.

A flight path symbol 18 is also displayed and indicates a track angle, a flight path angle, and a drift angle with respect to the heading angle. The term "flight path angle" is referred to herein to indicate an angle of a total velocity vector with respect to a local level. For example, the flight path angle indicates an elevation angle of the aircraft flight path. The term "drift angle," or drift, is referred to herein to indicate a resultant angle of the track minus the heading.

Figure 2:
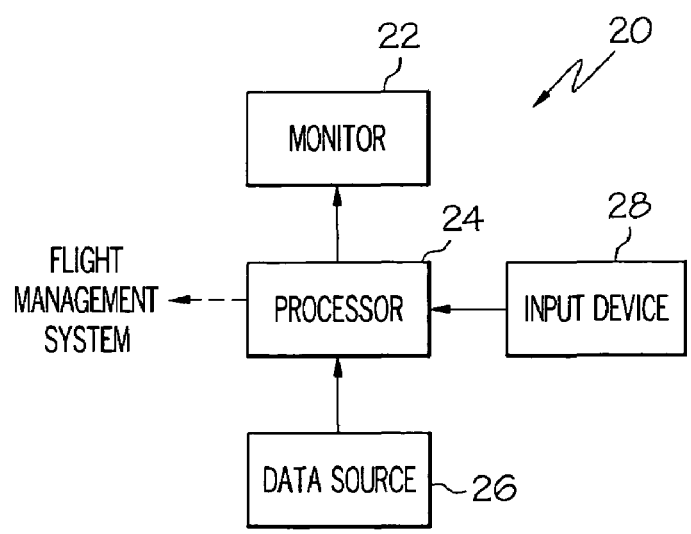
FIG. 2 is a schematic diagram illustrating an exemplary embodiment of a hybrid centered head-down display system in accordance with the present invention.

FIG. 2 is a schematic diagram illustrating an exemplary embodiment of a hybrid centered head-down display system 20 in accordance with the present invention. Although the present invention is described in terms of functional block diagrams, those of skill in the art will appreciate that such functional blocks may be realized in many different forms of hardware, firmware, and/or software components configured to perform the various functions. For example, the present invention may employ various integrated circuit components, e.g., memory elements, digital signal processing elements, look-up tables, and the like, which carry out a variety of functions under the control of one or more microprocessors or other control devices. Such general techniques are known to those skilled in the art and are not described in detail herein.

The hybrid centered head-down display system 20 includes a monitor 22, a processor 24 connected to the monitor 22 that controls the images displayed thereon to form a display, one or more data sources 26 connected to the processor 24, and optionally an input device 28 connected to the processor 24. Other display elements may be coupled with the hybrid centered head-down display 20. For example, the hybrid centered head-down display 20 may be incorporated with a multi-function display (MFD) system, a primary flight display (PFD), or the like. The hybrid centered head-down display 20 is configured for use in a commercial aircraft or any vehicle in which navigational aids, including airways, very high frequency (VHF) Omnirange stations (VORs), radio stations or non-directional beacons (NDBs), airports, and/or relative position information may be displayed.

A number of aspects of the monitor 22 (which are controlled by the processor 24 in a practical embodiment) contribute to the improved contents and appearance of the head-down display to increase the situational and navigational awareness of the pilot and/or flight crew. Image generation and display aspects of the display system 20 leverage known techniques such that existing avionics displays can be modified in a straightforward manner to support the different features described herein. In a practical implementation, the concepts described herein are realized in the form, for example, of a revised display generation software or processing resident at the processor 24.

In an exemplary embodiment, the hybrid centered head-down display system 20 provides an attitude display. The data sources 26 include, by way of example and not of limitation, databases, -on-board sensors, and the like, that provide static and real-time information. For example, databases of terrain data may be connected to the processor 24 for retrieval of information to display various terrain symbology on the display. Additionally, the on-board sensors provide real-time flight information (e.g., airspeed, altitude, heading, track, etc.) to the processor 24. The data sources 26 may take the form of a variety of conventional avionics devices such as memory elements, look-up tables, instrument outputs (e.g., radar), and processors such as may operate within a display system or a flight management system. In general, a user (e.g., a pilot) located within the aircraft provides input to the processor 24 through the input device 28 and receives visual feedback regarding the status of the aircraft via the display produced by monitor 22. Types of input the user may input include, but are not limited to, turning information, approach information, the presence of turbulent conditions, or intent to fly at higher than normal altitudes, etc. The processor 24 communicates with the input device 28 through which a pilot or crewmember can provide inputs to the display system 20 or an associated MFD system. The input device 28 may be, for example, a hand input device such as a mouse or a track-ball, a keyboard, or any device which allows a user to point to or select an item on the display.

The processor 24 encompasses one or more functional blocks used to provide a flight management, navigational, and positional interface with the pilot, and input to monitor 22. The processor 24 may include or cooperate with a mode, position, and/or detection element that is capable of determining the mode or position of the aircraft relative to one or more reference locations, points, planes, or navigation aids. For example, a conventional guidance system, gyroscope, global positioning system (GPS), inertial reference system (IRS), or the like, may interface with the processor 24 to provide attitude and direction information of the aircraft. In addition, the processor 24 may be configured to receive, analyze, condition, and process navigation and positional information associated with the aircraft. In this regard, the processor 24 may include any number of individual microprocessors, flight computers, navigation equipment, memories, storage devices, interface cards, and other standard components known in the art.

Additionally, the processor 24 may include any number of microprocessor elements, memory elements, power supplies, and other functional components as necessary to support the operation thereof. In this respect, the processor 24 may include or cooperate with any number of software programs or instructions designed to carry out various methods, process tasks, calculations, control functions, and generation of display signals and other data used by the monitor 22. As an example, the processor 24 is capable of calculating a displayed drift angle limit and an optimal displayed drift angle for the hybrid centered display in response to varying flight conditions and generating appropriate signals to the monitor 22. In addition, the processor 24 can access the need to apply dynamic filtering to adjust the flight path mark.

The processor 24 may also be configured to receive and process other flight data such as navigational and/or bearing data related to an intended destination of the aircraft for use in, for example, determining the drift angle limit. In a practical commercial aircraft application, such data may be associated with specific waypoints, an airport, navigational aids, or the like. The processor 24 may process data and generate appropriate signals to the monitor 22 such that monitor 22 generates symbols or indicia representative of the appropriate terrain, navigational or airport information, the drift angle limit, or the like. Such processors and flight control computers are available from a number of manufacturers such as Honeywell International Inc. In one exemplary embodiment, the processor 24 is incorporated with a flight management system (FMS) or another avionics component which, inter alia, formats navigation data and forwards the data to the monitor 22 for display as data.

The monitor 22 may include any display monitor suitable for displaying the various symbols and information detailed herein. Many currently known monitors are suitable for this task, including various cathode ray tube (CRT) and flat-panel display systems. In an exemplary embodiment, the monitor 22 includes a flat-panel display or the like. The display suitably includes various graphical elements associated with the surrounding environment of the aircraft including the location of terrain. Various navigational aids may also be included such as graphical elements representing VHF Omnirange stations, non-directional beacons, radio stations, and the like, and airports, airways, special use airspace, and other aircraft.

Figure 3:
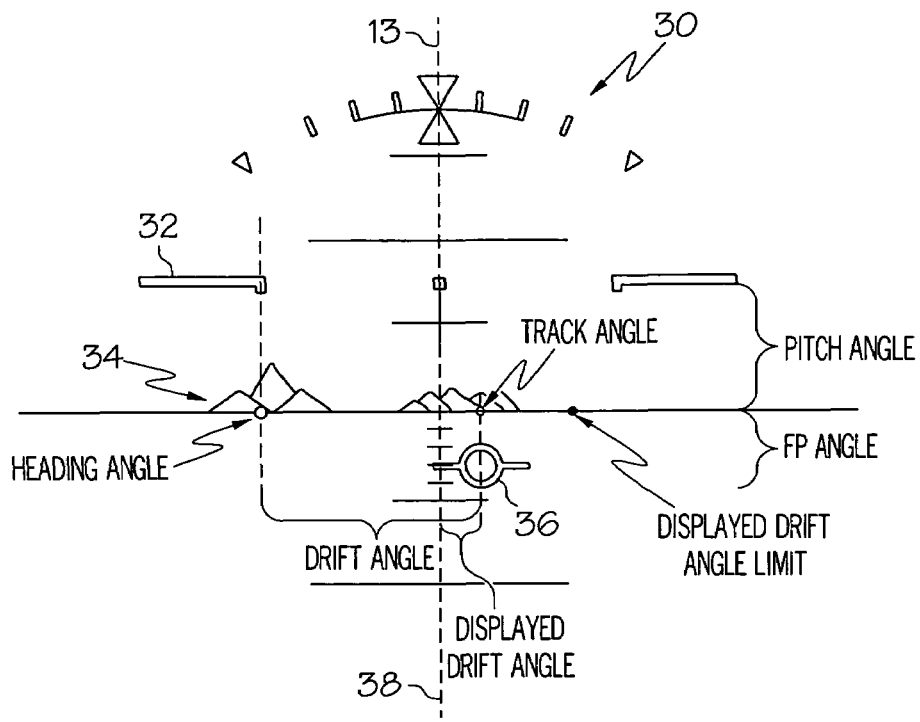
FIGS. 3 and 4 are diagrams illustrating views of a hybrid-centered head-down display in accordance with embodiments of the present invention.

FIG. 3 is a diagram illustrating a view of a head-down display 30 in accordance with an embodiment of the present invention. In this exemplary embodiment, a head-down display 30 is in a "hybrid track-up" or "hybrid centered" configuration. The hybrid centered head-down display 30 includes a symbol 32 representing the attitude of the aircraft. The attitude symbol 32 is constrained to a centerline 38 of the display 30, such as a centered vertical line. Earth referenced symbology 34, such as terrain, airports, and airfields, is also displayed on the head-down display 30 and is referenced with respect to a view along an angle between the heading angle and the track angle of the aircraft. In one exemplary embodiment, the centerline 38 of the display 30 is laterally centered with respect to the angle resulting from displacing the track angle by a displayed drift angle in the direction of the heading angle. The displayed drift angle is determined from a range of angles, from substantially equal to a pre-determined displayed drift angle limit, or less than the displayed drift angle limit and between the track and the heading. Display 30 is laterally centered at this displayed drift angle. The attitude symbol 32 may further indicate the pitch angle and roll angle of the aircraft. The term drift angle, is referred to herein as the actual aircraft crab angle as measured by on-board instruments such as inertial reference systems. The term displayed drift angle limit, is referred to herein as an artificial limit that is calculated to allow the flight path marker to drift away from the center of the display. More specifically, the displayed drift angle limit, also referred to herein as the drift angle limit, is the maximum angle that the displayed flight path marker is offset, with respect to the center of the display.

A flight path symbol 36 may also be generated on the display 30 that is laterally aligned with the track angle to indicate the flight path angle of the aircraft. In one exemplary embodiment, the display of the terrain symbology 34 on the hybrid centered head-down display 30 has the appearance of laterally translating the terrain symbology 34 to center the displayed drift angle in the display 30 and generate the view referenced along the displayed drift angle as aligned with the centerline 38 of the display 30. A heading symbol (not shown) may optionally be displayed on the hybrid centered head-down display 30 to indicate the heading of the aircraft with respect to the terrain symbology. In this exemplary embodiment, the offset of the attitude symbol 32 from the flight path symbol 36 may be used to convey to the flight crew a relative position of the terrain, such as may be viewed out of the cockpit, based on the terrain as rendered on the display 30.

As previously stated, the hybrid centered display 30 substantially centers the displayed drift angle in display 30 and generates the view as aligned with the centerline 38 of the display 30. Various approaches are used to calculate the displayed drift angle limit and ensure a smooth transition as well as to provide sufficient awareness of the heading and drift conditions. To accomplish this, the displayed drift angle limit, as previously described, is initially determined by the current state of flying. For example, during a steep turn of the aircraft, the actual direction of the aircraft travel is of greater importance than the heading information. Accordingly, the displayed drift angle limit is reduced so the center of the display 30 is more in the aircraft track direction as illustrated in FIG. 3. Similarly, during high altitude flying, when flying in turbulent conditions, or when flying away from destination airports, the displayed drift angle limit, also referred to as a hybrid drift angle limit, is reduced and less filtering is applied.

Figure 4:
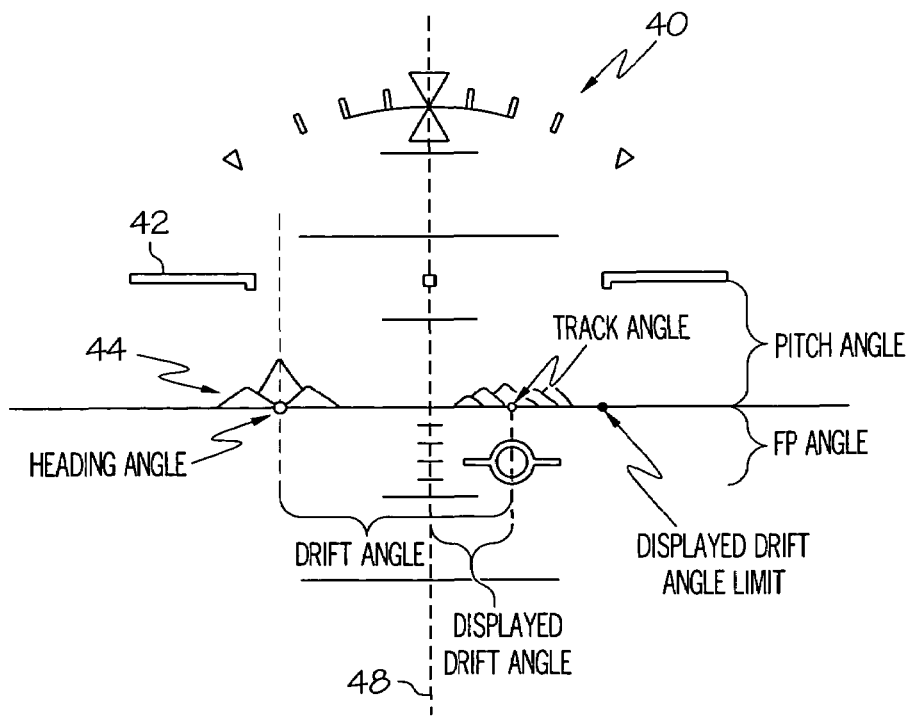

During other flight conditions, such as a final approach, the hybrid drift angle limit is increased as illustrated in display 40 of FIG. 4, but bounded to provide awareness for crab conditions while more filtering is applied. Similar to the display illustrated in FIG. 3, display 40 of FIG. 4 shows an attitude symbol 42 that is constrained to a centerline 48 of a display 40, such as a centered vertical line. Earth referenced symbology 44, such as terrain, airports, and airfields, is also displayed on the head-down display 40 and is referenced with respect to a view along an angle between the heading angle and the track angle of the aircraft. As illustrated, the centerline 48 of the display 40 is laterally centered with respect to the angle resulting from displacing the track angle by a displayed drift angle in the direction of the heading angle. The displayed drift angle is between the track and the heading and substantially equal to the drift angle limit or less. Display 40 is laterally centered at this angle.

A flight path symbol 46 may also be generated on the display 40 that is laterally aligned with the track angle to indicate the flight path angle of the aircraft. In one exemplary embodiment, the display of the terrain symbology 44 on the hybrid centered hybrid centered head-down display 40 has the appearance of laterally translating the terrain symbology 44 to center the displayed drift angle in the display 40 and generate the view referenced along the displayed drift angle as aligned with the centerline 48 of the display 40.

By combining various input, the processor 24 uses algorithms to calculate the optimal displayed drift angle(s), and displayed drift angle limit(s), during different flight conditions and determines the need to apply dynamic filters to adjust the flight path symbol 36 as shown in FIG. 3, and symbol 46 as shown in FIG. 4. The hybrid centered display 40 includes the use of filters at different bands. The displayed drift angle limit used in the hybrid centered mode of display 40 is set as a function of the present flying parameters, such as bank angle, flight plans, closeness to a target, relative altitude and the presence of turbulence.

Figure 5:
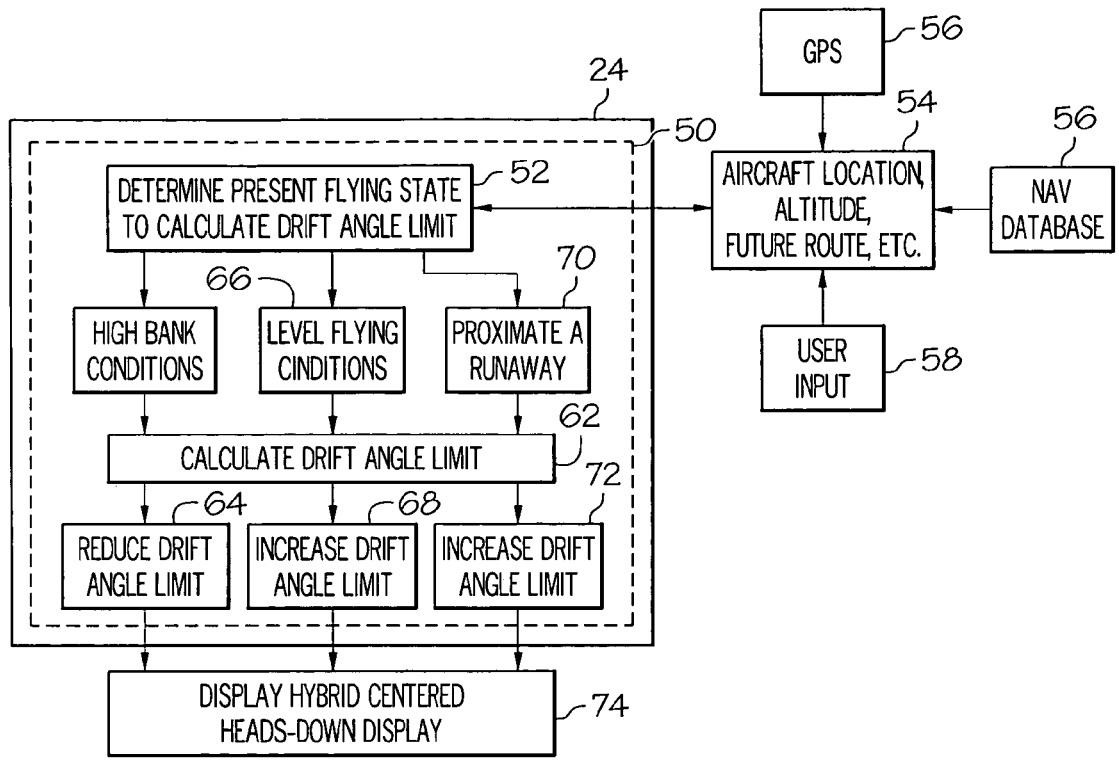
FIG. 5 is a flow diagram and schematic of an algorithm that may be used in a method for determining a displayed drift angle limit in a hybrid-centered head-down display of the present invention.

FIG. 5 is a flow diagram and schematic of an algorithm that may be used in a method for determining a displayed drift angle limit in a hybrid-centered head-down display of an aircraft. Although the present invention is described in terms of various processing steps, those of skill in the art will appreciate that the exemplary process illustrated may include additional or fewer steps or may be performed in the context of a larger processing scheme. Furthermore, the various methods presented in the drawing Figures or the specification are not to be construed as limiting the order in which the individual processing steps are performed. Referring now to FIG. 5, the processor 24 (FIG. 2) has a software (or firmware) based algorithm or process 50 in accordance with the invention. The aircraft's present flying state provides for the calculation of the displayed drift angle limit 52. The aircraft's present flying state, including location, altitude, future route, and the like 54, are continuously made available to the process 50. The future route may be provided by a navigation database 56 or may be entered manually by the aircraft crew. The location and altitude of the aircraft may be provided by sensors such as inertial sensors or by a GPS 56. In addition, aircraft crew can provide input 58 to the process 50 that indicates a parameter of interest. For example, proximity to a runway indicating a final approach phase, or departure from airport, or the like. Alternatively, parameters of interest may be preset.

The process 50 is performed by processor 24 and calculates a hybrid or displayed drift angle limit determined by the current state of flying. For example, when a high bank condition occurs 60, such as during a steep turn, the displayed drift angle limit is calculated 62, and continually reduced 64 to increase awareness of the present track of the aircraft. During substantially level flight conditions 66, the displayed drift angle limit is calculated 62, and the displayed drift angle limit may be increased 68 to increase awareness of crab conditions. During a final approach or takeoff, with the aircraft proximate a runway 70, the displayed drift angle limit is calculated 62, and increased 72 to display crab conditions. Subsequent to the calculation of the drift angle limit for the present flying state, the hybrid centered head-down format is displayed 74. It should be understood that the displayed drift angle component and flight path marker movement are additions of fast varying and slow varying components with the coefficients for each of the components dependent upon the present state of flying. The coefficient selection is dependent upon the flight plan selection, weather conditions and the presence of turbulence, and selections input by the flight crew.

Figure 6:
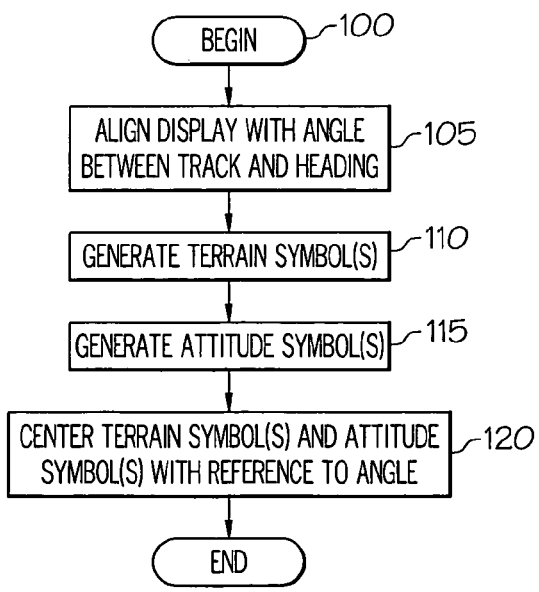
FIG. 6 is a flow diagram illustrating an exemplary embodiment of a method for displaying information on a display of an aircraft in accordance with the present invention.

FIG. 6 is a flow diagram illustrating an exemplary embodiment of a method for displaying information on a hybrid centered head-down display of an aircraft. The method begins at step 100. The centerline 38 of the hybrid centered track-up head-down display 30 shown in FIG. 3, or centerline 48 as shown on display 40 of FIG. 4, is aligned with a selected displayed drift angle that is equal to an angle between the track and the heading of the aircraft at step 105 dependent upon flying conditions and in keeping with a calculated displayed drift angle limit. Depending on the particular display configuration, a processor, such as the processor 24 shown in FIG. 2, orients the symbology generated on the display for the hybrid centered configuration. The processor 24 (FIG. 2) retrieves or receives data regarding earth referenced symbology, such as terrain, airports, runways, and the like, from a data source, such as the data source 26 shown in FIG. 2. In addition, processor 24 retrieves or receives data regarding current flight conditions, including but not limited to, relative altitude, presence of turbulent conditions, bank angles, flight plans, and proximity to a target. The processor 24 using algorithms calculates the optimal displayed drift angle limit for the hybrid centered head-down display 30 shown in FIG. 3, or display 40 shown in FIG. 4.

A monitor, such as the monitor 22 shown in FIG. 2, generates earth referenced symbology on the display, such as the terrain symbology 34 shown in FIG. 3 or the terrain symbology 44 shown in FIG. 4, at step 110 based on the data retrieved by the processor 24 (FIG. 2). Depending on the particular display configuration, the terrain symbology is generated on the display by the monitor 22 with reference to the selected angle and calculated drift angle limit.

The monitor 22 (FIG. 2) generates an attitude symbol on the display, such as the attitude symbol 32 shown in FIG. 3 or the attitude symbol 42 shown in FIG. 4, at step 115 based on the data retrieved by the processor 24 (FIG. 2) relating to the attitude of the aircraft. The attitude symbol is generated by the monitor 22 (FIG. 1) with reference to the selected angle. In an exemplary embodiment, the attitude symbol is offset based on the drift angle.

The earth referenced symbology and attitude symbol are positioned on the display with reference to the selected angle at step 120. More specifically, the terrain symbology is generated by the monitor 22 (FIG. 2) on the display to simulate the view in front of the aircraft along the selected angle that is between the track angle and the heading angle. In The attitude symbol is laterally centered with the centerline of the display which is aligned with the selected angle, as previously mentioned with respect to step 105. Positioning of the earth referenced symbology and attitude symbol, as well as other elements shown on the display, is determined by the processor 24 (FIG. 2) based on the flight data and selected angle.

A flight path symbol, such as the flight path symbol 36 shown in FIG. 3 or the flight path symbol 46 shown in FIG. 4, may optionally be generated by the monitor 22 (FIG. 2) on the display. The flight path symbol is laterally aligned on the display by the monitor 22 (FIG. 2) with the track angle of the aircraft. As previously mentioned, the flight path symbol may also indicate the flight path angle. Additionally, a heading symbol, such as the heading symbol 37 shown in FIG. 3, may also be generated by the monitor 22 (FIG. 2) on the display. In one exemplary embodiment, the processor 24 (FIG. 2) obtains data from the data source 26 (FIG. 2) regarding the heading and flight path of the aircraft and communicates with the monitor 22 (FIG. 2) to generate the flight path symbol and heading symbol. As previously mentioned, the data source 26 (FIG. 2) may provide static information, such as from a database, and real-time information, such as from on-board sensors. Additional data may also be retrieved by the processor 24 (FIG. 2) depending on a desired content to be displayed on the display, such as navigational beacon data, and corresponding symbology may be generated by the monitor 22 (FIG. 2) on the display as controlled by the processor 24 (FIG. 2).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for displaying information on a hybrid centered head-down display of an aircraft, the aircraft having a track angle, a heading angle, and an attitude, said method comprising the steps of:
    determining a present flying state of the aircraft and calculating a displayed drift angle limit in response;
    calculating a displayed drift angle having a value less than or equal to the displayed drift angle limit;
    aligning a centerline of the display between the track angle and heading angle with the track angle offset from the centerline by the displayed drift angle;
    generating a first symbol on the display, the first symbol corresponding to a terrain;
    generating a second symbol on the display, the second symbol corresponding to the attitude; and
    centering the first symbol and the second symbol with reference to the centerline.

2. The method of claim 1, wherein the step of calculating a displayed drift angle limit includes calculating a continually decreasing displayed drift angle limit in response to a flight condition requiring increased attention to the direction of aircraft movement.

3. The method of claim 2, wherein the step of calculating a displayed drift angle limit includes calculating a continually decreasing displayed drift angle limit in response to one of a high bank condition, a terrain obstacle, aircraft traffic, and a weather condition.

4. The method of claim 1, wherein the step of calculating a displayed drift angle limit includes calculating a continually increasing displayed drift angle limit to provide awareness of track and heading directions.

5. The method of claim 4, wherein the step of calculating a displayed drift angle limit includes calculating a continually increasing displayed drift angle limit in response to one of a level flight condition and a runway approach.

6. The method of claim 1, wherein the step of calculating a displayed drift angle limit includes operator selection of the displayed drift angle limit.

7. The method of claim 1, further comprising the step of generating a third symbol on the display, the third symbol corresponding to a track of the aircraft.

8. The method of claim 1, wherein said centering step comprises laterally centering the first symbol and the second symbol with the displayed drift angle.

9. The method of claim 8, further comprising the steps of:
    generating a third symbol on the display, the third symbol corresponding to a flight path of the aircraft; and
    laterally centering the third symbol with the track of the aircraft.

10. A hybrid centered head-down display system for an aircraft having a track angle, a heading angle, and an attitude, said head-down display system comprising:
    a monitor configured to generate a display of a view in front of the aircraft, said display having a centerline; and
    a processor coupled to said monitor and configured to:
        determine a displayed drift angle limit in response to a present flying state of the aircraft;
        determine a displayed drift angle, said displayed drift angle having a value equal to or less than said displayed drift angle limit and having a value between the track angle and the heading angle;
        align said centerline of said display between the track angle and the heading angle wherein the track angle is offset from the centerline by the displayed drift angle; and
        generate on said display:
            a first symbol representing a terrain as viewed in front of the aircraft, said processor further configured to position said first symbol with reference to the centerline; and
            a second symbol representing the attitude, said processor further configured to align said second symbol with reference to the centerline.

11. The system of claim 10, wherein said displayed drift angle limit is continually decreasing in response to one of a high banking condition, a terrain obstacle, aircraft traffic, and a weather condition, thereby providing increased awareness of the track of the aircraft.

12. The system of claim 10, wherein said displayed drift angle limit is continually increasing in response to one of a level flying condition and a runway approach, thereby providing increased awareness of crab conditions.

13. The system of claim 10, wherein the aircraft has a flight path and wherein said processor is further configured to:
    generate on said display a third symbol representing the flight path; and
    position said third symbol with reference to the centerline.

14. The system of claim 10, wherein said processor is further configured to generate on said display a third symbol representing the heading and position said third symbol with reference to the centerline.

15. A program product for a hybrid centered head-down display of an aircraft, the aircraft having a track angle, a heading angle, and an attitude, said program product comprising:
    an avionics display program executable to:
        calculate a displayed drift angle limit in response to present flight conditions;
        calculate a displayed drift angle, said displayed drift angle having a value between the track angle and the heading angle, and equal to or less than the displayed drift angle limit;

center the display with reference to said displayed drift angle, wherein said display includes a centerline between the track angle and the heading angle, wherein the track angle is offset from the centerline by the displayed drift angle;

generate on the display:
- a first symbol representing a terrain as viewed in front of the aircraft; and
- a second symbol representing the attitude, said program further executable to center said first symbol and said second symbol with reference to said centerline.

16. The program product of claim 15, wherein the displayed drift angle limit is continually increasing in response to one of a level flying condition and a runway approach, thereby providing increased awareness of crab conditions.

17. The program produce of claim 15, wherein the displayed drift angle limit is continually decreasing in response to one of a high banking condition, a terrain obstacle, aircraft traffic, and a weather condition, thereby providing increased awareness of the track of the aircraft.

18. The program product of claim 15, wherein said avionics display program is executable to laterally center said first symbol and said second symbol with said centerline.

19. The program product of claim 15, wherein the aircraft has a flight path and wherein said avionics display program is further configured to:
- generate on said display a third symbol representing the flight path; and
- position said third symbol with reference to the centerline.

20. The program product of claim 15, wherein said avionics display program is further configured to:
- generate on said display a third symbol representing the heading and position; and
- position said third symbol with reference to the centerline.

* * * * *